United States Patent [19]
Yamazaki

[11] Patent Number: 5,568,166
[45] Date of Patent: Oct. 22, 1996

[54] CASSETTE ACTUATED PAPER JAM RELEASE FOR RECORDING APPARATUS

[75] Inventor: Manabu Yamazaki, Tokyo, Japan

[73] Assignee: Kabushiki Kaisha Toshiba, Kanagawa-ken, Japan

[21] Appl. No.: 191,510

[22] Filed: Feb. 4, 1994

[30] Foreign Application Priority Data

Feb. 5, 1993 [JP] Japan ............................ 5-002911 U

[51] Int. Cl.⁶ .......................... G01D 15/24; G01D 15/26; G01D 15/34; B65H 5/00
[52] U.S. Cl. ......................................... 346/134; 271/10.01
[58] Field of Search ................... 355/200, 318, 355/308, 309; 347/138, 218; 346/134; 271/121, 124, 119, 162, 164, 171, 16, 10.01, 10.09, 9.05; 400/578

[56] References Cited

U.S. PATENT DOCUMENTS

| | | | |
|---|---|---|---|
| 5,383,655 | 1/1995 | Hayakawa et al. | 271/10.01 |
| 5,443,251 | 8/1995 | Kan et al. | 271/16 |

*Primary Examiner*—Benjamin R. Fuller
*Assistant Examiner*—Thinh Nguyen
*Attorney, Agent, or Firm*—Finnegan, Henderson, Farabow, Garrett & Dunner, L.L.P.

[57] ABSTRACT

A recording apparatus having a housing, a paper cassette insertable into the housing to a loaded position at which paper sheets may be advanced from the cassette to a paper feed path in the housing, the cassette being removable from the housing. A sheet handling device is supported by the housing to be located in the paper feed path downstream from the loaded position of the cassette. The sheet handling device includes a rotatable feed component, a pressing component to retain a sheet of paper against the feed component, and a movable holder to support the pressing component for movement between an active position against the feed component and a retracted position spaced from the feed component. Cooperating components on the paper cassette and the holder move the holder to locate and retain the pressing component in the active position upon insertion of the cassette to the loaded position and move the pressing component to the retracted position upon removal of the cassette from the housing.

10 Claims, 7 Drawing Sheets

FIG. 11

CASSETTE ACTUATED PAPER JAM RELEASE FOR RECORDING APPARATUS

BACKGROUND OF THE INVENTION

1. Field of Invention

The present invention relates generally to a recording apparatus, such as a facsimile and a copying apparatus, and, more particularly, to a recording apparatus having a structure which operates to feed individual sheets of paper to a recording section provided in the recording apparatus.

2. Description of the Related Art

Figure 10:
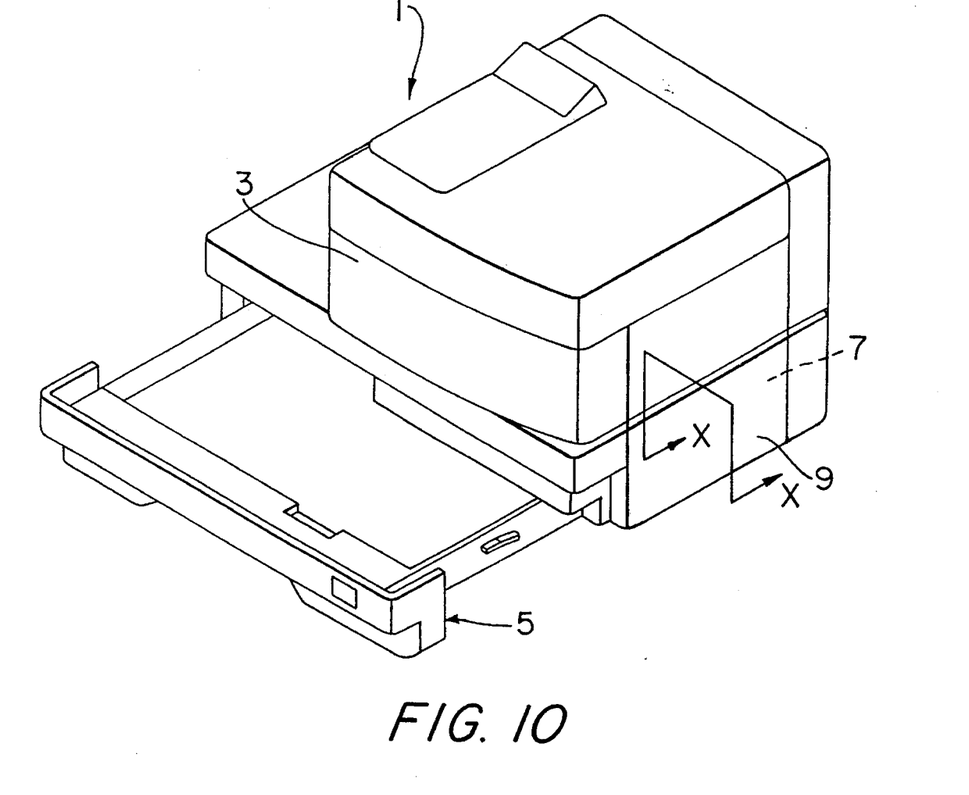
FIG. 10 is a perspective view illustrating a conventional recording apparatus.

FIG. 10 shows a conventional facsimile apparatus 1, which includes a recording section 3 and a cassette 5 for storing paper. Although not shown in the drawings, the recording section 3 contains well-known components for recording an image on each paper. The facsimile apparatus 1 further includes a sheet handling device 7 behind a side wall cover 9 for feeding individual sheets of paper from a cassette 5 to the recording section 3.

Figure 11:
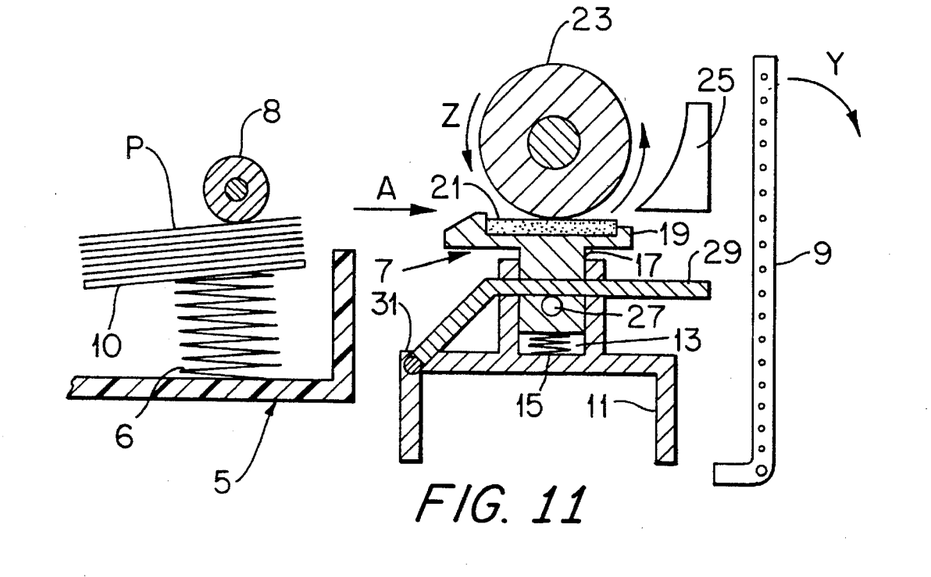
FIG. 11 is a cut-away elevational view taken along X—X line of FIG. 10.

FIG. 11 shows a cross-section view taken along line X—X of FIG. 10 showing the feeding structure. In FIG. 11, the cassette 5 is shown to include a spring 6 with a follower board 10. The cassette 5 is installed in the housing so that the spring 6 urges a stack of papers P toward a roller 8 provided in the apparatus 1. The roller 8 is driven in rotation to feed paper in a direction A. The cover 9 is pivoted in the housing of the apparatus 1 to open in a direction Y.

The illustrated sheet handling device 7 includes a base 11 having a recess 13 that receives a spring 15 and a cylinder portion 17 of a paper clamping device 19. The paper clamping device 19 has a pad 21. The spring 15 urges the cylinder portion 17 and the pad 21 toward a roller 23. The roller 23 rotates in a direction Z and feeds each sheet of paper to a guide portion 25. The pad 21 functions as a drag to inhibit feeding of more than one sheet in the event that a plurality of sheets are accidently fed from the cassette 5 by the roller 8.

The cylinder 17 has a pin 27. A lever 29 is pivotably attached to the base 11 to engage the pin 27 when the user pushes the lever 29 downward. Such action results in a space between the pad 21 and the roller 23. Thus, if a paper jam occurs at the position between the pad 21 and the roller 23, the user can remove a jammed paper from the space between the pad 21 and the roller 23 after opening the cover 9 in the direction Y.

However, the opening through which the lever 29 is accessed is very narrow and the lever must be held against the spring to remove a jammed sheet of paper. Therefore, it is very difficult for the user to move and hold the lever downward after the occurrence of a paper jam.

Further, the requirement for the lever 29 to be pivotably mounted to the base 11 complicates the structure of the paper clamping device 19.

SUMMARY OF THE INVENTION

Accordingly, the present invention has been made in view of the above circumstances and has, as an object, to provide a recording apparatus which facilitates removal of a jammed paper in the apparatus.

Another object of the present invention is to provide a recording apparatus which simplifies structure in the apparatus to provide a space for removing the jammed paper.

Additional objects and advantages of the invention will be set forth in part in the description which follows and in part will be apparent from the description, or may be learned by practice of the invention. The objects and advantages of the invention may be realized and attained by means of the instrumentalities and combinations particularly pointed out in the written description and claims hereof as well as appended drawings.

To achieve these and other objects and advantages and in accordance with the purposes of the invention, there is provided a recording apparatus comprising a housing, a paper cassette insertable into the housing to a loaded position at which paper sheets may be advanced from the cassette to a paper feed path in the housing, the cassette being removable from the housing, a sheet handling device supported by the housing to be located in the paper feed path downstream from the loaded position of the cassette, the sheet handling device including a rotatable feed component, a pressing component to retain a sheet of paper against the feed component, and a movable holder to support the pressing component for movement between an active position against the feed component and a retracted position spaced from the feed component, and cooperating means on the paper cassette and the holder for moving the holder to locate and retain the pressing component in the active position upon insertion of the cassette to the loaded position and for moving the pressing component to the retracted position upon removal of the cassette from the housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention. In the drawings.

DESCRIPTION OF THE PREFERRED EMBODIMENTS

Reference will now be made in detail to the present preferred embodiments of the invention, examples of which are illustrated in the accompanying drawings.

Figure 1:
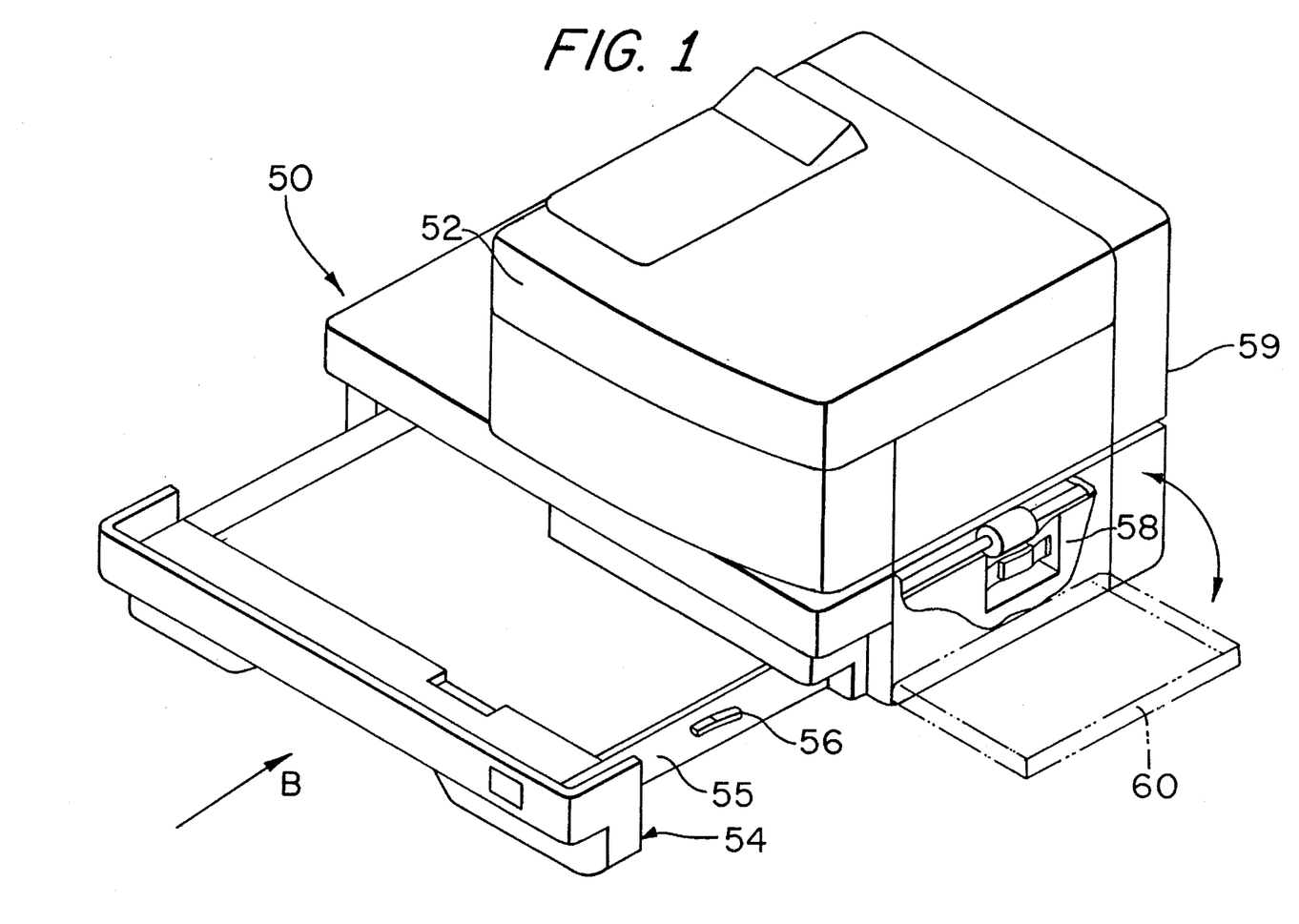
FIG. 1 is a perspective view illustrating a first embodiment of the present invention.

In FIG. 1, a facsimile apparatus 50 is shown to include a recording section 52 and a cassette 54 for storing multiple sheets of paper. The recording section 52 has a well-known structure (not shown) for recording an image on each sheet of paper. The cassette 54 includes a side wall 55 and a cam and support component 56 at an outer face of the side wall 55. The cassette 54 is insertable into a housing 59 of the apparatus 50 to a loaded position in a direction B and removable from the housing 59 in the opposite direction. In the loaded position of the cassette 54, paper sheets may be advanced from the cassette to a paper feed path in the housing.

In accordance with the present invention a sheet handling device is supported by the housing to be located in the paper feed path downstream from the loaded position of the cassette. The sheet handling device includes a rotatable feed component, a pressing component to retain a sheet of paper against the feed component, and a movable holder to support the pressing component for movement between an active position against the feed component and a retracted position spaced from the feed component.

Thus, in the illustrated embodiment, the facsimile apparatus 50 includes a sheet handling device 58 for feeding each sheet of paper to the recording section 52. The housing 59 of the apparatus 50 has a side cover 60 pivotably mounted on the housing 59.

Figure 2:
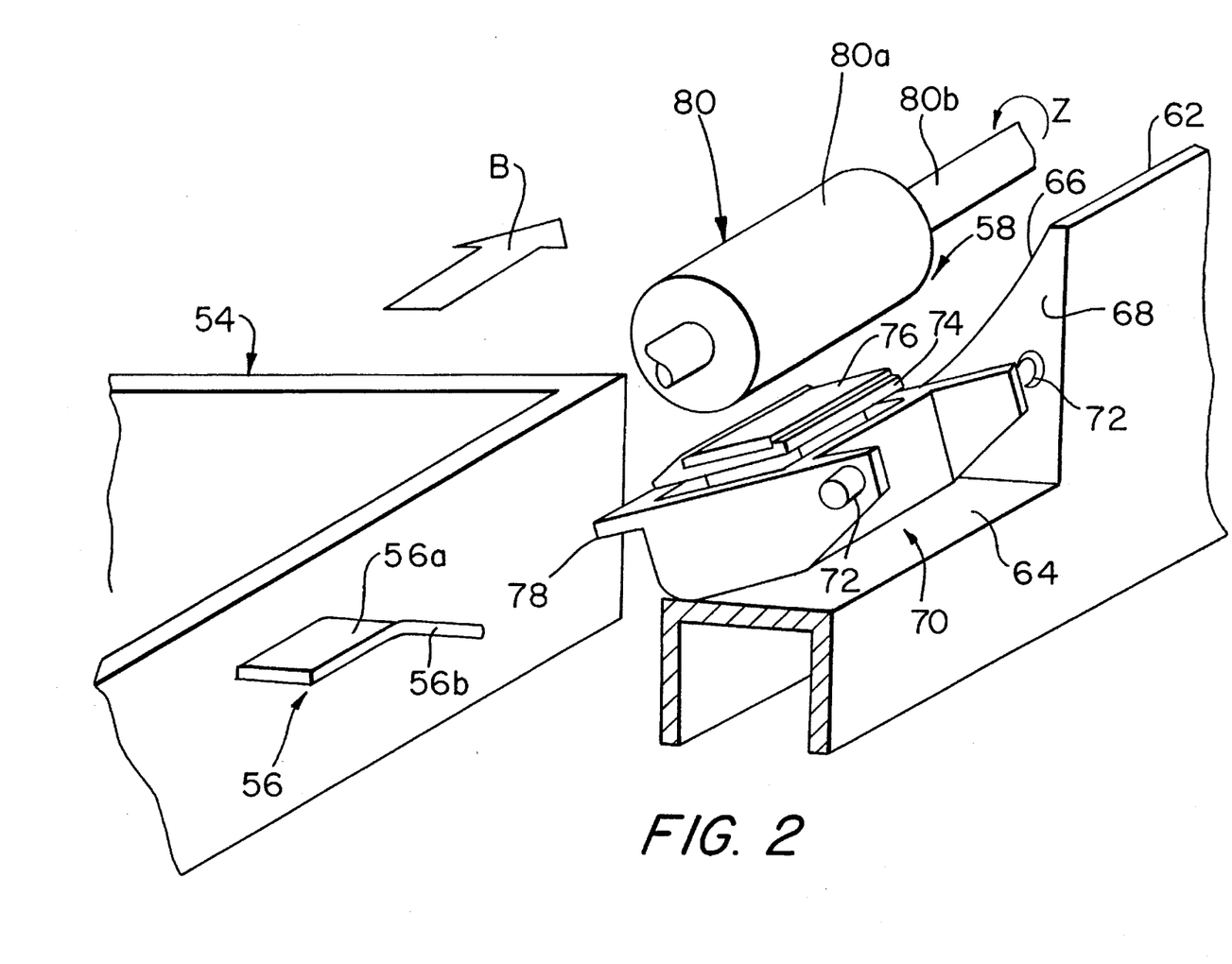
FIG. 2 is a fragmentary perspective view illustrating the first embodiment of the present invention with an insertable paper cassette removed.

As shown in FIG. 2, the sheet handling device 58 includes a base 62 having a recess 64 and a guide portion 66. The recess 64 is defined by two inner wall surfaces 68. A holder 70 supports a paper clamping device 74 to be described in more detail hereinafter. The holder 70 is pivotally supported from the two inner wall surfaces 68 by two pins 72. The paper clamping device 74 includes a pressing component, such as a pad 76, and is urged upward by a spring 73 (FIG. 3) provided in the holder 70. The holder 70 further includes a flange 78.

The handling device 58 further includes a rotatable component provided as a roller 80*a* and a shaft 80*b* fixed to the roller 80*a* in the illustrated embodiment. The shaft 80*b* rotates in a direction Z during a period designated by a control circuit (not shown) of the apparatus.

The sheet handling device 58, like the device 7 described above with reference to the conventional facsimile apparatus 1, functions as a paper sheet separating device in the illustrated embodiment. As an incident to serving this function, the device 58 represents a paper sheet clamping mechanism which must be opened to release a jammed paper sheet for removal from the apparatus 50. Other types of sheet handling devices, which releasably clamp a sheet of paper fed from the cassette 54, may be used in place of the illustrated device 58 in accordance with the intended scope of the present invention. For example, auxiliary feed devices, such as a pinch roller pair in which on roller is retractably pressed against a fixed axis roller, or a feed belt and a retractable belt or roller biased to retain a sheet of paper against the feed belt would be the equivalent of the illustrated device 58.

In accordance with the invention, cooperating means are provided on the paper cassette and the holder of the paper handling device for moving the holder to locate and retain the pressing component in said active position upon insertion of the cassette to the loaded position, and for moving the pressing component to a retracted position upon removal of the cassette from the housing.

In the illustrated embodiment, the cassette 54 is provided with the cam and support component 56 which includes a horizontal portion 56*a* and an inclined portion 56*b* as shown most clearly in FIG. 2. When the cassette 54 is not installed in the apparatus 50, the holder 70 rests against a bottom surface of the recess 64 because of its own weight. The flange 78 is in a position to be located, relative to the cassette during insertion, at an elevation higher than the end of the inclined portion 56*b* of the component 56.

When the cassette 54 is inserted into the apparatus 50 in the direction B, the inclined portion 56*b* engages and lifts the flange 78 in response to insertion movement of the cassette 54. When the cassette 54 is further inserted into the apparatus 50, the horizontal portion 56*a* engages and supports the flange 78.

Figure 3:
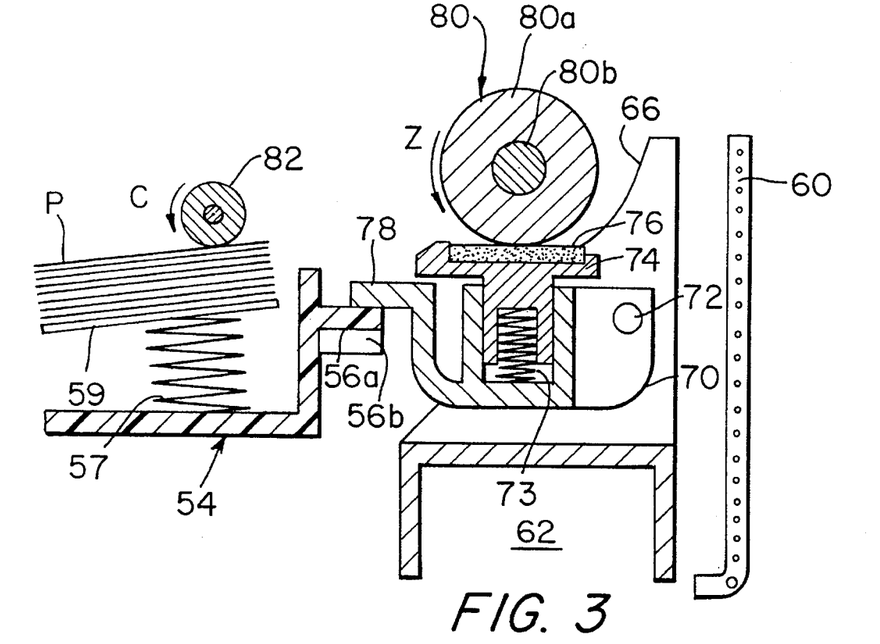
FIG. 3 is a fragmentary cross-sectional elevational view illustrating the first embodiment of the present invention with the cassette mounted in the housing.

In FIG. 3, which illustrates the apparatus with the cassette 54 fully inserted to the loaded position thereof, the horizontal portion 56*a* supports the flange 78. Further, the spring 73 yieldably supports the paper clamping device 74 having the pad 76. As a result, the pad 76 is urged toward the roller 80*a* and engages the roller 80*a* under the bias of the spring 73.

The cassette 54 further includes a spring 57 with a follower board 59. The apparatus further includes a feed roller 82. The stack of paper P is installed in the cassette 54 so that the sheets of paper P are clamped between the board 59 and the roller 82. In this state, when an image recording operation of the apparatus is started, the roller 82 rotates in a direction C. Therefore, one or more sheets of paper are fed to the position between the pad 76 and the roller 80*a*. In this state, when the roller 80*a* rotates in the direction Z, the friction between the roller 80*a* and a sheet of paper contacting the roller 80*a* causes that sheet of paper to be separated from other sheets of paper and to be fed to the guide portion 66. The paper fed to the guide portion 66 is then guided toward the recording section 52 not shown in FIG. 3.

If a paper jam occurs during recording an image on the paper, the following notice (not shown in FIG. 3) appears at a position of the housing in clear view to the user. "If a paper jam occurs, please withdraw the paper cassette from the housing and open the side cover." In response to the notice on the housing 59, the user can withdraw the cassette 54 from the housing 59 and open the side cover 60.

Figure 4:
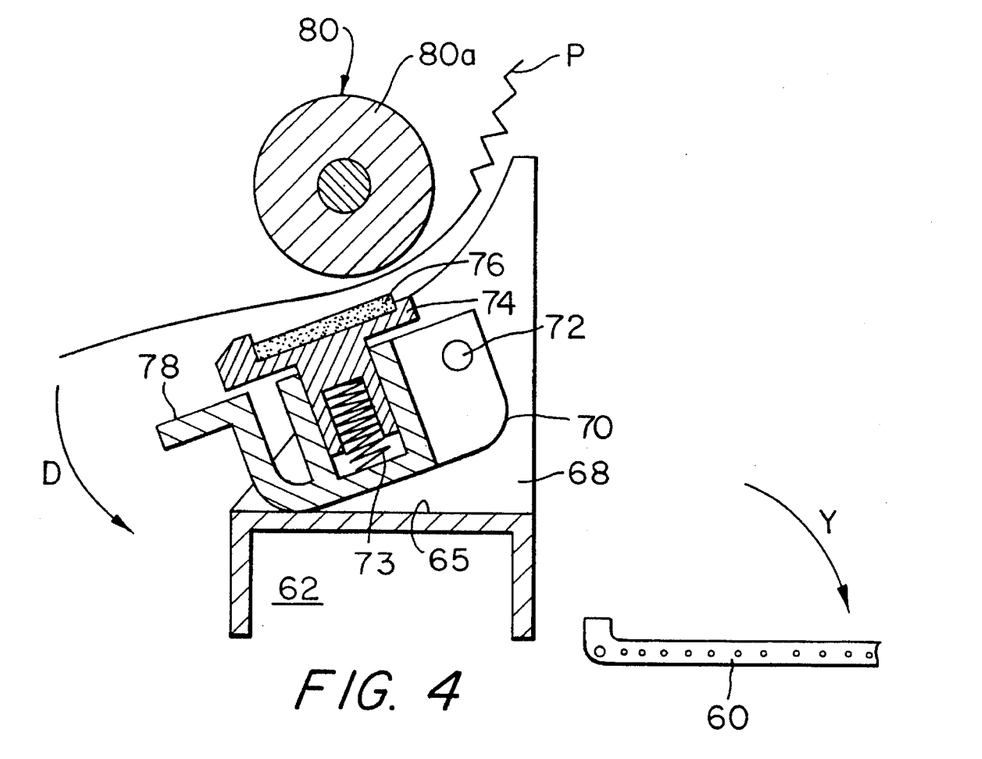
FIG. 4 is a fragmentary cross-sectional elevational view illustrating the first embodiment of the present invention when the cassette is removed from the housing.

In FIG. 4, which illustrates the state of components after the cassette is so withdrawn by the user, since the cam and support component 56 on the cassette 54 does not any longer support the flange 78, the holder 70 pivots under its own weight about the pins 72 in a direction D. The flange 78 pivots until the holder 70 strikes against the bottom 65 of the recess 64.

The holder 70 is thus located in a position lower than the contacting position of the roller 80*a* and pad 76. As a result, a space is provided between the pad 76 and the roller 80*a*. The user can remove the jammed paper located in the space.

In the above embodiment, after the user opens the cover 60 and withdraws the cassette 54 from the apparatus 50, the space is provided between the pad 76 and the roller 80*a* in response to the withdrawal of the cassette 54. The withdrawal of the cassette 54 is easier than the operation of the conventional lever in the narrow space in the conventional apparatus. Therefore, it is not only easy to remove the jammed paper, but the pivotal lever of the conventional apparatus is not required.

Figure 5:
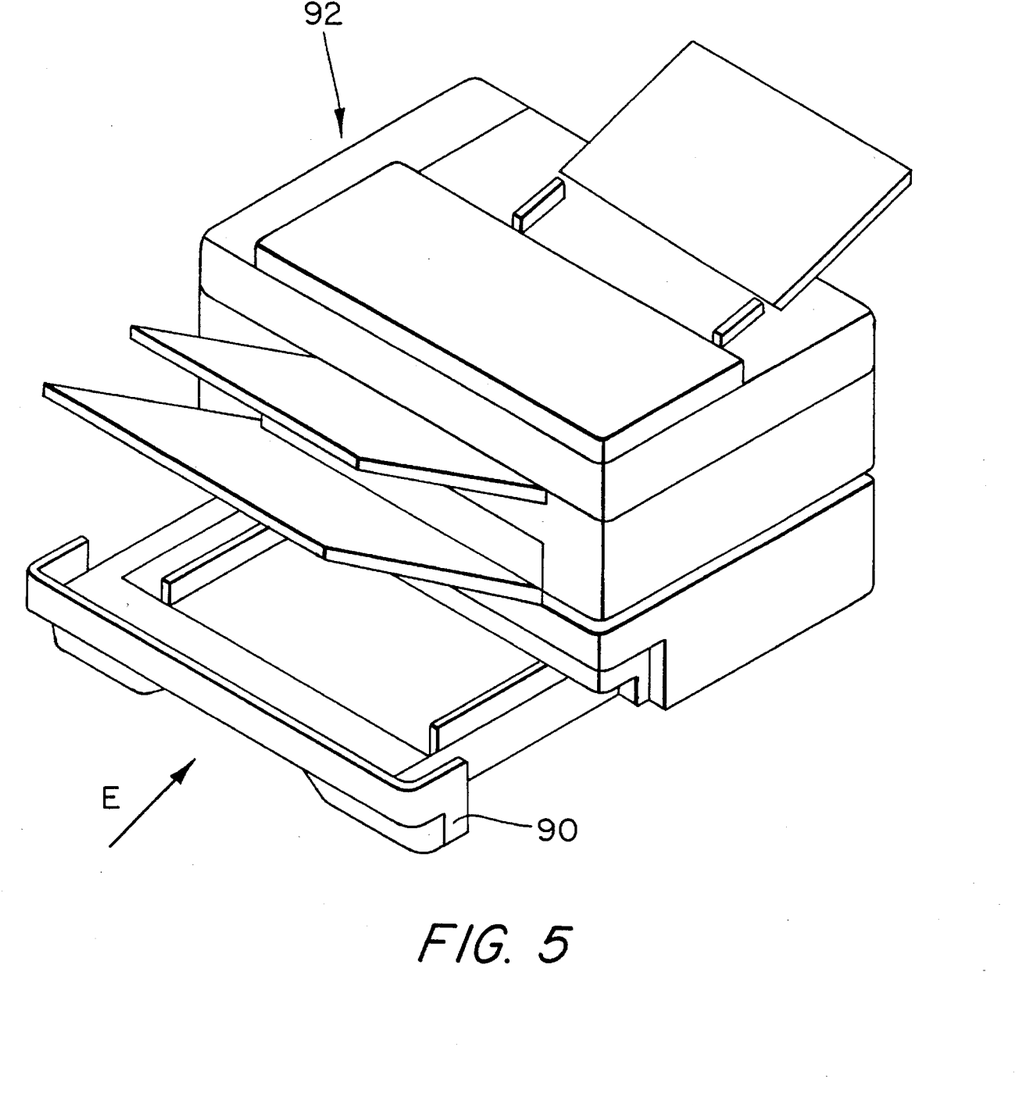
FIG. 5 is a perspective view illustrating a second embodiment of the present invention.
Figure 6:
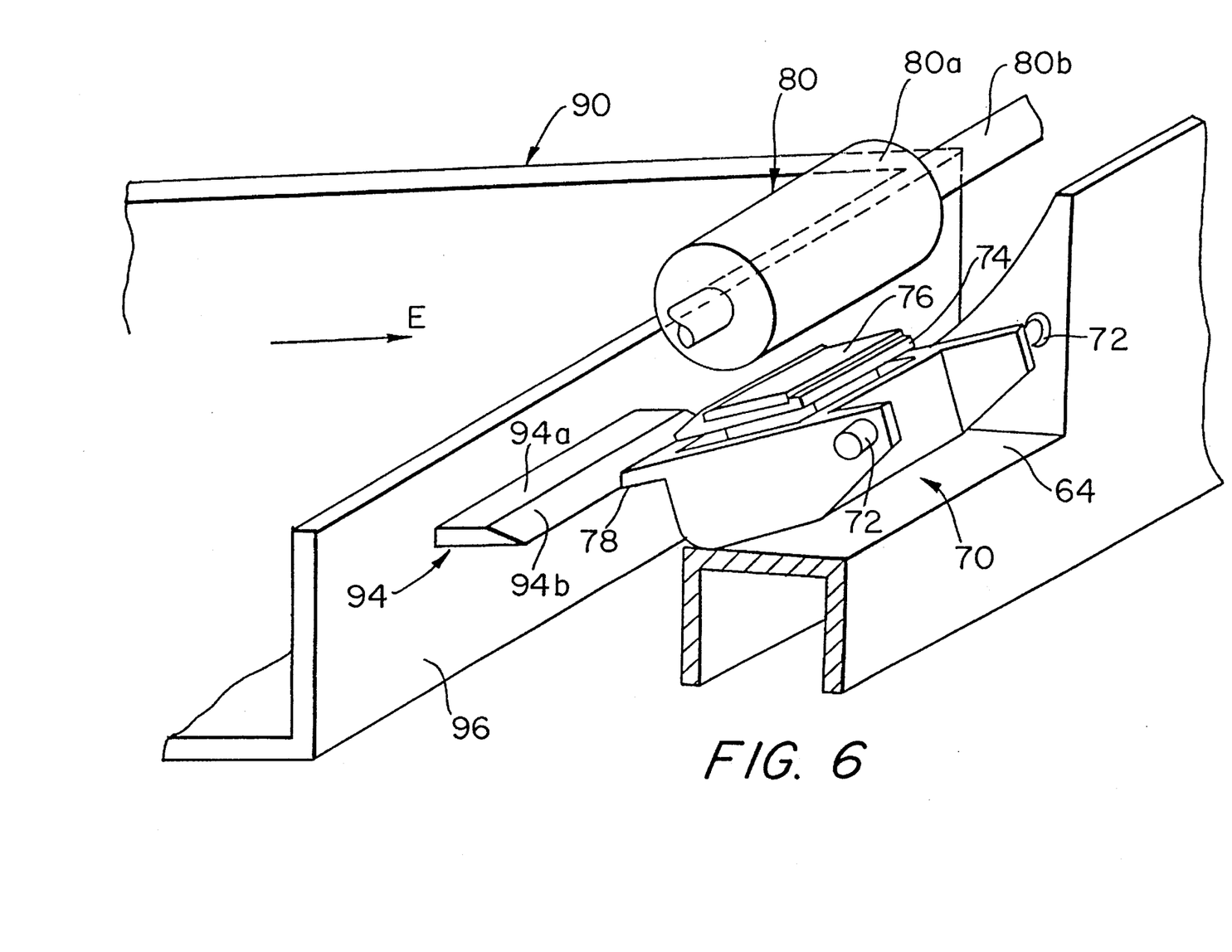
FIG. 6 is a fragmentary perspective view illustrating the second embodiment of the present invention with the cassette removed from the housing.

FIGS. 5 and 6 show a second embodiment of the present invention. The second embodiment differs from the first embodiment primarily with respect to the direction of the cassette insertion relative to the sheet handling device.

In FIG. 5, a cassette 90 is shown to contain paper in the same manner as the first embodiment. The cassette 90 is inserted into the apparatus 92 in a direction E. As shown in FIG. 6, the cassette 90 includes a cam and support component 94 in a rear wall 96. Further, the apparatus 92 includes a sheet handling device 58 in a rear portion.

In FIG. 6, components previously described with reference to FIG. 2 have the same reference numerals, thus further description of such components is unnecessary.

The cassette 90 includes the cam and support component 94 fixed to the rear wall 96 of the cassette 90. The cam and support component 94 includes a horizontal portion 94a and an inclined portion 94b.

When the cassette 90 is inserted into the apparatus 92 in the direction E, the inclined portion 94b of the component 94 lifts the flange 78. When theicassette 90 is completely inserted to its loaded position in the apparatus 92, the horizontal portion 94a of the component 94 supports the flange 78.

If the jam occurs, the user withdraws the cassette 90 as in the first embodiment. In response to the withdrawal of the cassette 90, the holder 70 pivots about the pin 72 under its own weight and rests against the bottom of the recess 64. As a result, the space between the pad 76 and the roller 80a is provided.

Figure 7:
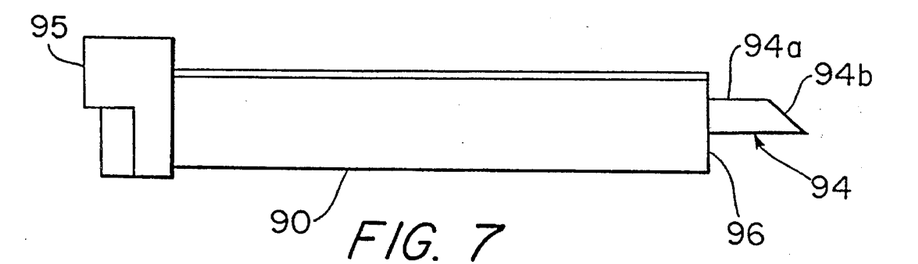
FIG. 7 is a cut-away elevational view illustrating the cassette provided in the second embodiment of the present invention.

FIG. 7 shows a side view of the complete cassette 90 of the second embodiment, including the cam and support component 94, the rear wall 96, and a portion 95 forming the front wall of the cassette 90.

While the present invention has been described with respect to a facsimile apparatus having a structure such as shown in the above figures, the invention can also be effectively applied to other apparatus such as a copying apparatus.

Figure 8:
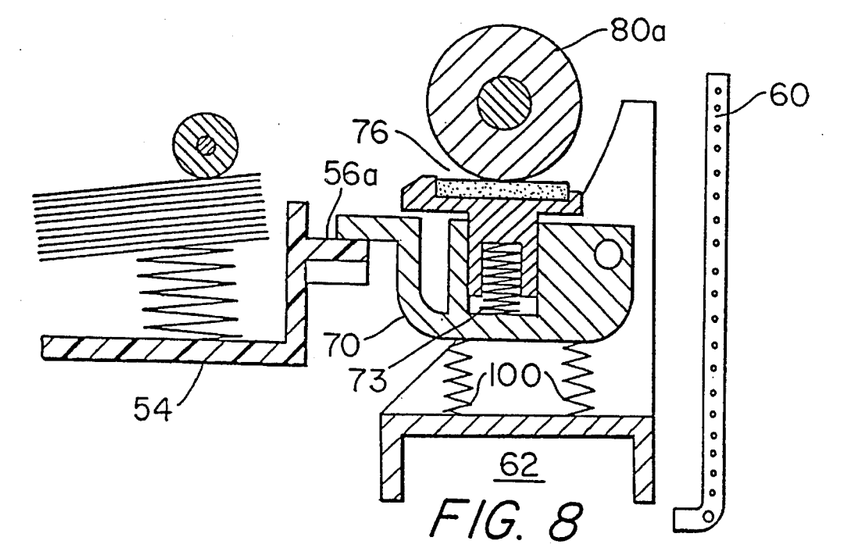
FIG. 8 is a fragmentary cross-sectional elevational view illustrating a third embodiment of the present invention with a cassette mounted in the housing.

Although in the described embodiments, the holder 70 is pivotably supported by the base 62, the invention is not limited to this arrangement. In FIG. 8, a third embodiment of the invention is shown and which differs from the first and second embodiments with respect to mounting the holder 70 on the base 62. FIG. 8 shows a state in which the cassette 54 is in a loaded position in the apparatus. Two springs 100 connect the base 62 and the holder 70. In this state, the springs 100 urge the holder 70 toward the base 62. Further, the horizontal portion 56a of the cam and support component on the cassette 54 supports the flange 78. Therefore, the pad 76 contacts the roller 80a.

Figure 9:
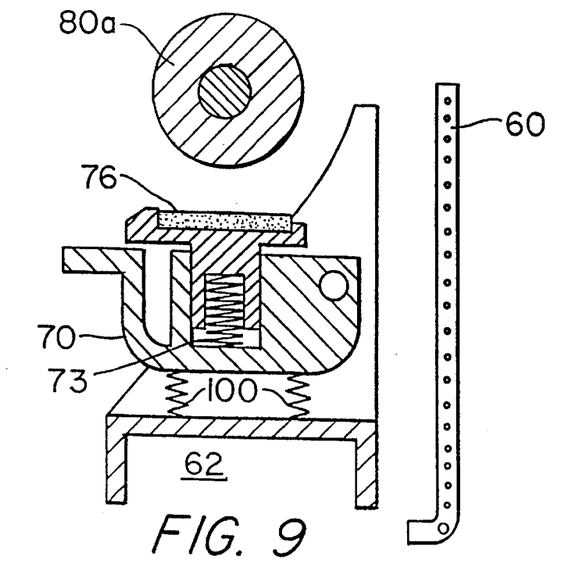
FIG. 9 is a fragmentary cross-sectional view illustrating the third embodiment of the present invention with the cassette removed from the housing.

If a paper jam occurs, the user withdraws the cassette 54 and opens the side cover as the same manner as the first and second embodiments to provide the state of the apparatus shown in FIG. 9. Since the springs 100 urge the holder 70 toward the base 62, the holder 70 moves downward. Therefore a space between the pad 76 and the roller 80a is developed. As a result, the user can remove the jammed paper located between the pad 76 and the roller 80a.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A recording apparatus comprising:

a housing;

a paper cassette insertable into the housing to a loaded position at which paper sheets are advanced from the cassette to a paper feed path in the housing, said cassette being removable from the housing;

a sheet handling device supported by the housing, said housing located in the paper feed path downstream from the loaded position of the cassette, said sheet handling device including a rotatable feed component, a pressing component to retain a sheet of paper against the feed component, and a movable holder to support the pressing component for movement between an active position against the feed component and a retracted position spaced from the feed component; and cooperating means, including a lifting and support component on the cassette, and a lifted and supported portion on the holder, for lifting and supportinq the holder so that the pressing component is retained in said active position upon insertion of the cassette to said loaded position, and for moving said pressing component to said retracted position upon removal of the cassette from the housing.

2. The recording apparatus of claim 1 wherein one of said lifting and support component and said lifted and supported portion includes a flange follower.

3. The recording apparatus of claim 1 wherein the lifted and supported portion includes a flange follower on the movable holder.

4. The recording apparatus of claim 2 wherein the lifting and snpport component comprises a support portion extending parallel to the direction of cassette insertion, and an inclined lifting portion on a leading edge of the support portion.

5. The recording apparatus of claim 1 wherein the cassette includes a side wall with an outer surface, said lifting and support component projecting as a formation from the outer surface of said side wall.

6. The recording apparatus of claim 1 wherein the cassette includes a rear wall with an outer surface, said lifting and support component projecting as a formation from the outer surface of said rear wall.

7. The recording apparatus of claim 1 wherein the rotatable component comprises a roller, and the apparatus further includes an elastic member between the pressing component and the movable holder for biasing the pressing component against the roller.

8. The recording apparatus of claim 7 wherein the pressing component is a friction pad.

9. The recording apparatus of claim 1 further including a guide portion to direct a sheet of paper downstream from the cassette, the movable holder being pivotably supported by the guide portion 10. The recording apparatus of claim 1 further including a guide portion to direct a sheet of paper downstream from the cassette, and spring means for supporting the movable holder elastically against movement from the guide portion.

* * * * *